United States Patent
Yeo et al.

(12) 
(10) Patent No.: US 6,346,311 B1
(45) Date of Patent: *Feb. 12, 2002

(54) PROJECTION SCREEN MATERIAL AND METHODS OF MANUFACTURE

(75) Inventors: Terry Yeo, Cambridge, MA (US); Chris Barnett, Abergavenny Gwent; Omar Basil, Stanford in the Vale, both of (GB)

(73) Assignee: Nashua Corporation, Nashua, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,389

(22) Filed: Sep. 10, 1998

Related U.S. Application Data (60) Provisional application No. 60/058,365, filed on Sep. 10, 1997.

(51) Int. Cl.$^7$ .......................... B32B 15/02; D06N 7/04; G03B 21/60
(52) U.S. Cl. .......................... 428/143; 428/147; 428/172; 428/327; 428/402; 359/452; 359/455
(58) Field of Search ................................ 428/156, 147, 428/143, 172, 212, 327, 402, 913; 359/452, 453, 742, 455

(56) References Cited

U.S. PATENT DOCUMENTS

| | | | |
|---|---|---|---|
| 4,666,248 A | 5/1987 | van de Van | 350/128 |
| 4,767,186 A | 8/1988 | Bradley, Jr. et al. | 350/128 |
| 4,911,529 A | 3/1990 | Van De Ven | 350/127 |
| 4,983,016 A | 1/1991 | Yamamoto | 350/126 |
| 5,064,273 A | 11/1991 | Lee | 359/457 |
| 5,066,099 A | 11/1991 | Yoshida et al. | 359/457 |
| 5,237,004 A | 8/1993 | Wu et al. | 525/85 |
| 5,275,854 A | 1/1994 | Maier et al. | 428/36.5 |
| 5,289,311 A | 2/1994 | McClelland et al. | 359/457 |
| 5,442,482 A | 8/1995 | Johnson et al. | 359/619 |
| 5,473,454 A * | 12/1995 | Blanchard et al. | 359/69 |
| 5,473,469 A | 12/1995 | Magocs et al. | 359/449 |
| 5,485,308 A | 1/1996 | Hirata et al. | 359/457 |
| 5,486,884 A | 1/1996 | De Vaan | 353/122 |
| 5,513,036 A | 4/1996 | Watanabe et al. | 359/457 |
| 5,513,037 A | 4/1996 | Yoshida et al. | 359/457 |
| 5,541,769 A | 7/1996 | Ansley et al. | 359/451 |
| 5,543,870 A | 8/1996 | Blanchard | 353/74 |
| 5,594,561 A | 1/1997 | Blanchard | 349/59 |
| 5,625,489 A | 4/1997 | Glenn | 359/455 |
| 5,706,134 A * | 1/1998 | Konno et al. | 359/599 |
| 5,870,224 A * | 2/1999 | Saitoh et al. | 359/456 |
| 5,932,342 A | 8/1999 | Zeira et al. | 428/327 |
| 6,123,877 A | 9/2000 | Clabburn | 264/1.34 |

FOREIGN PATENT DOCUMENTS

| | | | |
|---|---|---|---|
| EP | 0 311 189 | 4/1989 | |
| EP | 0 464 499 A2 | 1/1992 | |
| EP | 0464499 A2 * | 1/1992 | |
| EP | 0 269 324 B1 | 12/1992 | |
| EP | 0 342 288 B1 | 12/1993 | |
| GB | 1 580 722 | 12/1980 | |
| JP | 5-113606 | 5/1993 | G03B/21/60 |

OTHER PUBLICATIONS

D.W. Vance, "34.2: A Novel High-Resolution Ambient-Light-Rejecting Rear-Projection Screen", *SID 94 Digest*, pp. 741–744 (1994).

* cited by examiner

*Primary Examiner*—Donald J. Loney
(74) *Attorney, Agent, or Firm*—Testa, Hurwitz & Thibeault, LLP (57) ABSTRACT

Disclosed is a light-transmissive material and methods of its manufacture. The light-transmissive material of the invention uses two distinct particles in a diffusive layer to provide increased light transmissive properties. For example, when used as a rear projection screen, the light-transmissive material of the invention exhibits high gain, high contrast, and low scintillation. In another embodiment of the invention, the light-transmissive material includes light channeling contrast enhancement layer.

16 Claims, 6 Drawing Sheets

PROJECTION SCREEN MATERIAL AND METHODS OF MANUFACTURE

RELATED APPLICATION

This application claims the benefit of copending U.S. Provisional Patent Application Serial No. 60/058,365, filed Sep. 10, 1997, the entire disclosure of which is incorporated by reference herein.

FIELD OF THE INVENTION

The invention relates generally to a light-transmissive material and methods of manufacture and more specifically to the use of such a material in a rear projection screen.

BACKGROUND OF THE INVENTION

Light-transmissive materials which are suitable for rear projection screens typically sacrifice the vertical angle of view in order to optimize the horizontal angle of view and the gain of the screen. There exists a need to provide low cost light-transmissive materials in which the vertical angle of view and the horizontal angle of view may be optimized independently of one another.

The present invention addresses these needs.

SUMMARY OF THE INVENTION

A light-transmissive material has been developed which provides increased light-transmissive properties. The light-transmissive material of the invention uses two distinct particles to provide the increased light-transmissive properties. When used in a rear projection screen, the light-transmissive material of the present invention exhibits high gain, high contrast, low scintillation, and optimal horizontal and vertical angles of view.

The light-transmissive material generally includes a matrix and a plurality of ellipsoidal dispersive particles and a plurality of spheroidal dispersive particles disposed within the matrix. The ellipsoidal particles typically have their major axes oriented substantially orthogonal to the direction at which the material will be viewed. The two distinct particle types each independently contributes to the overall performance of the material.

In another embodiment of the invention, the light-transmissive material includes a light channeling contrast enhancement layer. The light channeling contrast enhancement layer permits viewing under high ambient light conditions.

The light-transmissive material can be economically manufactured using methods of the invention. In a broadest form of the method, an appropriate matrix material, a first substantially spheroidal dispersion material and a second dispersion material are combined to form a mixture. The second dispersion material is capable of being deformed into ellipsoidal dispersive particles at an appropriate processing temperature. Subsequent to mixing, a sheet of material typically is formed from the mixture, heated to the processing temperature and stretched along an axis to produce the light-transmissive material of the invention. By stretching the material, the second dispersive material is deformed into ellipsoidal particles while the first dispersive material remains substantially spheroidal, thereby providing the two particle types embedded in the matrix for enhanced performance.

The invention will be understood further upon consideration of the following drawings, description and claims.

DESCRIPTION OF THE DRAWINGS

The invention is pointed out with particularity in the appended claims. The drawings are not necessarily to scale, emphasis instead generally being placed upon illustrating the principles of the invention. The advantages of the invention described above, as well as further advantages of the invention, may be better understood by reference to the description taken in conjunction with the accompanying drawings, in which:

Like reference characters in the respective drawn figures indicate corresponding parts.

DETAILED DESCRIPTION OF THE INVENTION

In order to more clearly and concisely describe the subject matter of the claims, the following definitions are intended to provide guidance as to the meaning of specific terms used in the following written description, examples and appended claims. Furthermore, U.S. patent application Ser. No. 08/962,743, filed Nov. 3, 1997 now abandoned, describes in detail, various materials and methods applicable to the present invention and is incorporated herein by reference.

Figure 1:
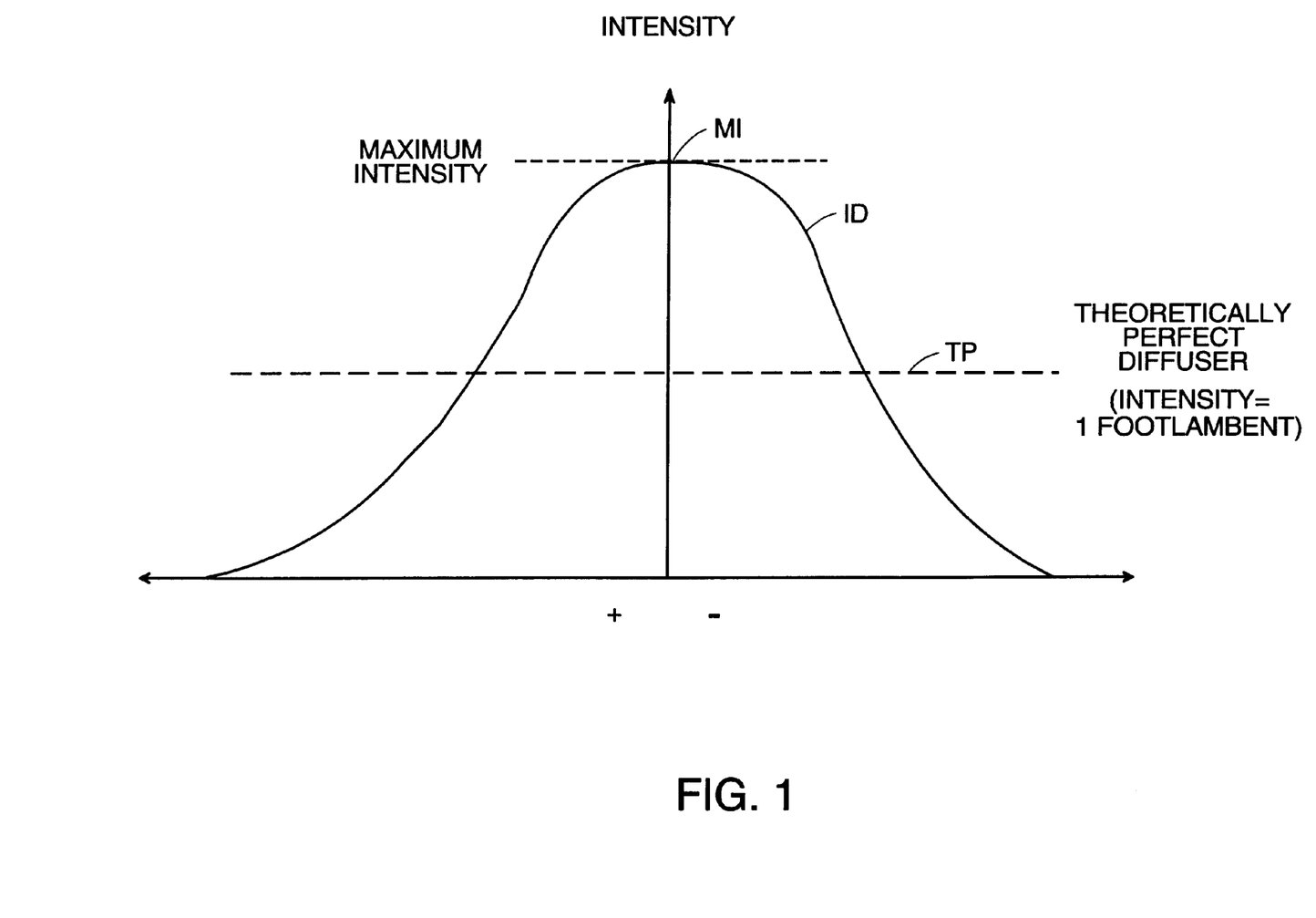
FIG. 1 is a graph depicting the intensity of a planar imperfect diffuser over a range of angles relative to an axis orthogonal to the plane of diffuser.

As used herein the term "gain" means a ratio of the maximum intensity of light transmitted through a light-transmitting material in a given direction relative to the intensity of light transmitted through a theoretically perfect diffuser in the same direction. To measure the gain of a particular sheet of material, a known amount of light is supplied to the sheet, and the maximum intensity of light transmitted through the sheet is measured using a standard luminance meter. The maximum intensity of light measured is then compared to a theoretically "perfect" diffusive material. FIG. 1 is a graph depicting the intensity of light transmitted through a planar imperfect diffuser over a range of angles measured relative to a direction orthogonal to the plane of the diffuser.

The gain for the imperfect diffuser depicted is the value of the maximum intensity (MI) divided by the value of the intensity of the theoretically perfect diffuser (line TP). For a theoretically perfect diffusive material, providing one footcandle (10.76 lumen/m$^2$) of illumination to the material results in the transmission of one footlambert of luminance at all angles of transmission (line TP). Therefore, if the maximum intensity of luminance transmitted by a material is equal to one footlambert, its gain with respect to a theoretical diffuser is 1.0 for that angle of transmission. For imperfect diffusers (line ID) the gain will be maximum (MI)

and larger than 1 for a viewing direction orthogonal to the plane of the diffuser.

This means that the screen is brighter when viewed orthogonal to the plane than at other angles. Because the light transmitted by the material can never be more than the amount of light supplied, less light must be transmitted at angles other than the angle of maximum intensity.

"Angle of view" (AOV) as used herein is a measurement of illumination for all angles relative to two perpendicular axes in the plane of the material. These are called the X axis or the horizontal axis, and the Y axis or the vertical axis. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the transmitted light intensity at one-half the maximum light intensity is measured and noted. For example, if angles of +35° and −35° were measured to have one-half of the maximum light intensity in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\chi(\frac{1}{10})$) are calculated similarly, except that they are calculated from the angles at which the transmitted light intensity is one-third and one-tenth of the maximum light intensity respectively.

The "asymmetry ratio" as used herein is the horizontal AOV $\alpha(\frac{1}{2})$ divided by the vertical AOV $\alpha(\frac{1}{2})$, and thus is a measure of the degree of asymmetry between the horizontal illumination and the vertical illumination of the diffuser.

A "spheroidal particle" is a particle substantially resembling a sphere. A spheroidal particle may contain surface incongruities and irregularities but has a generally circular cross-section in substantially all directions. An "ellipsoidal particle" is a particle substantially resembling an ellipsoid of revolution. An ellipsoid of revolution has two substantially equal minor axes and one larger major axis.

Figure 2:
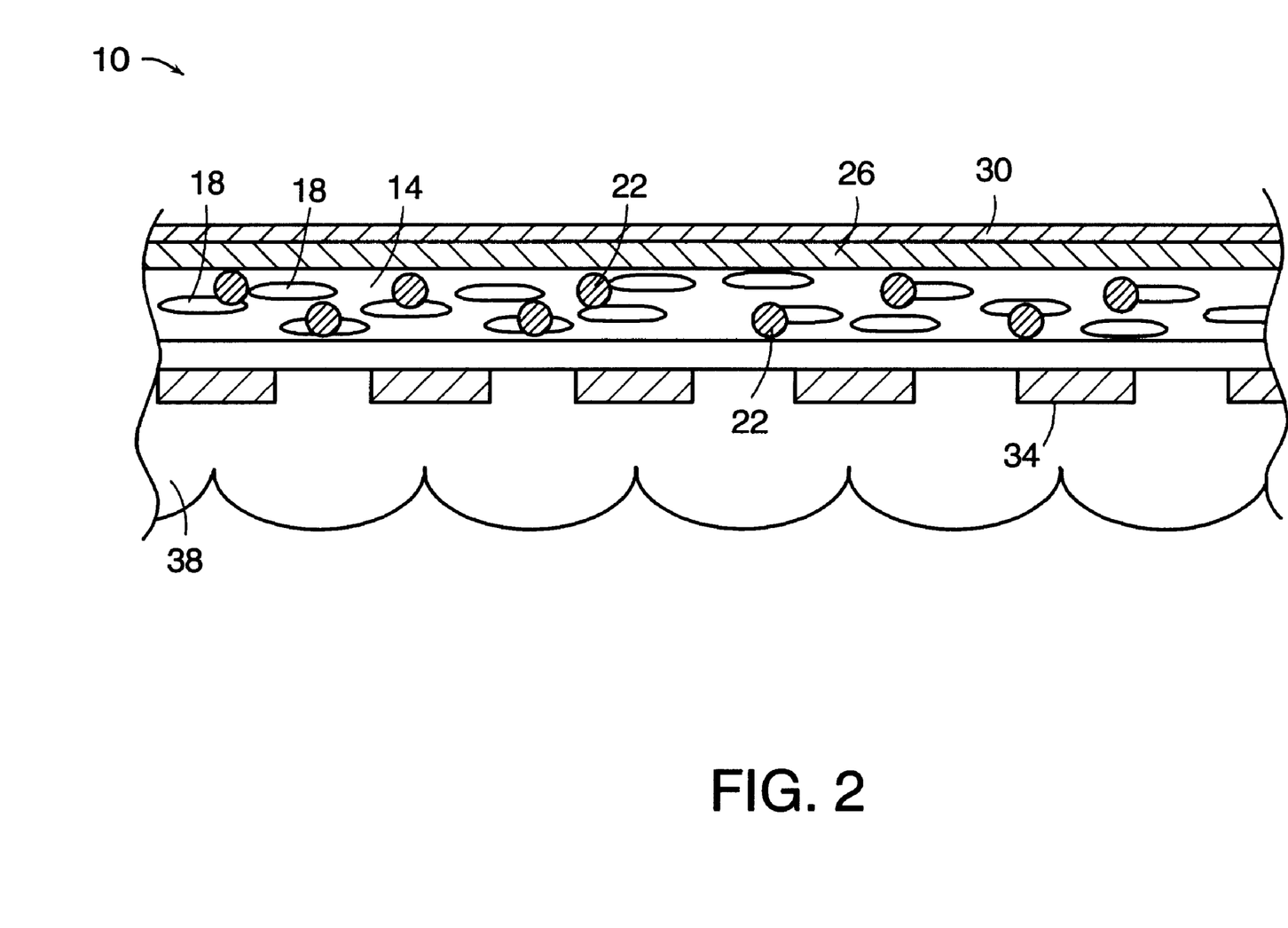
FIG. 2 is a schematic cross-sectional side view of an embodiment of a light-transmissive material constructed in accordance with the present invention.

FIG. 2 is a schematic cross-sectional side view of an embodiment of a light-transmissive material 10 constructed in accordance with the present invention. In general overview, the light transmissive material 10 includes a planar matrix 14 with embedded ellipsoidal particles 18, and embedded spheroidal particles 22. The material 10 may also include an optional hardcoat 26 and an optional anti-reflective coating 30. The material 10 may also include an opaque grid contrast layer 34 and a lens layer 38.

The matrix 14 is preferably durable, stable, and allows lamination to other materials, such as a hardcoat, an anti-reflective coating, or a contrast enhancement layer. Suitable matrix materials include acrylics, such as polymethylmethacrylates; polyesters; polystyrenes; polyolefins, such as polyethylenes, polypropylenes, and their copolymers; polyamides; organic acid cellulose esters, such as cellulose acetate butyrates, cellulose acetates, and cellulose acetate propionates; and polycarbonates. In a preferred embodiment, polypropylene/polyethylene copolymers may be used.

The embedded ellipsoidal particles 18 typically are all oriented with their major axes substantially in one direction in the plane of the surface of the material. Preferably, the ellipsoidal particles are made from a material which is capable of being deformed at a processing temperature in order to create their ellipsoidal shape by stretching. Further, the volume density of the particles, the average ellipsoidal particle minor axis size, and the index of refraction the ellipsoidal particles may be optimized to control the horizontal viewing angle and other desired properties of the material.

The oriented ellipsoidal particles 18 act as individual lenses to preferentially refract the light passing through it in the horizontal direction resulting in an increased the horizontal AOV relative to a screen not having the ellipsoidal particles. This is generally achieved at the expense of the vertical refraction of light, and thus, the vertical angle of view. Therefore, as discussed in greater detail below, the addition of the spheroidal particles 22 to increase the vertical refraction of light independently of the ellipsoidal particles represents a significant improvement in the art.

The average particle size of the ellipsoidal particles in the matrix may be from about 1 micrometer ($\mu$m) to about 30 $\mu$m, preferably from about 2 $\mu$m to about 15 $\mu$m, and most preferably from about 2 $\mu$m to about 5 $\mu$m in the minor dimension.

The differential refractive index ($\Delta n_{ME}$) defined as the absolute value of the difference between the index of refraction of the matrix ($n_M$) and the index of refraction of the ellipsoidal particles ($n_E$), or $|n_M - n_E|$, may be from about 0.005 to about 0.2, and preferably is from about 0.007 to about 0.1.

A suitable processing temperature for forming the ellipsoidal particles may be determined from the glass transition temperature and melt temperature of the ellipsoidal particle material used and the amount of deformation desired. A processing temperature approaching or close to the glass transition temperature will result in less deformation than a processing temperature approaching or surpassing the melt temperature, with all other variables including the amount the material is stretched remaining the same.

Suitable materials for the ellipsoidal particles include acrylics, such as polymethylacrylates; polystyrenes; polypropylenes; organic acid cellulose esters, such as cellulose acetate butyrates, cellulose acetates, and cellulose acetate propionates; and polycarbonates. In a preferred embodiment, polystyrene may be used.

The spheroidal particles 22 are preferably substantially incapable of deformation at the processing temperature so that they remain substantially spheroidal throughout the formation of the ellipsoidal particles 18. The spheroidal particles contribute to the vertical AOV, which might otherwise fall below desired levels when the ellipsoidal shape and orientation is induced in the ellipsoidal particles 18. Also, the presence of the spheroidal particles serves to minimize the amount of scintillation or speckle.

The volume density and the average particle size may be optimized to control the vertical viewing angle and other desired properties of the material, for example, to minimize or eliminate scintillation.

The average particle size of the spheroidal particles in the matrix may be from about 1 micrometer ($\mu$m) to about 30 $\mu$m, preferably from about 5 $\mu$m to about 30 $\mu$m, and most preferably from about 10 $\mu$m to about 30 $\mu$m.

The differential refractive index ($\Delta n_{MS}$) defined as the absolute value of the difference between the index of refraction of the matrix ($n_M$) and the index of refraction of the ellipsoidal particles ($n_S$), or $|n_M - n_S|$, may be from about 0.005 to about 0.2, and preferably is from about 0.007 to about 0.1.

A suitable spheroidal particle material may be chosen such that it is substantially incapable of deformation at the processing temperature by choosing a material for which the glass transition temperature and the melt temperature is higher than the processing temperature.

Suitable spheroidal particle materials include acrylics, and preferably cross-linked acrylics, such as the so-called "core-shell" cross-linked acrylic polymers manufactured by Rohm and Haas Company (Philadelphia, Pa.), described in U.S. Pat. Nos. 3,992,486; 4,107,210; and 4,181,769; and incorporated herein by reference.

The material 10 may also include an optional hardcoat 26 to increase the stability of the light-transmissive material, and an optional anti-reflective coating 30. The hardcoat may be any light-transmissive support layer, for example a siloxane-based polymer layer. Optionally, the hardcoat may include a tint, traditionally used to increase the contrast of the screen.

The material 10 may also include an opaque grid contrast layer 34 and a lens layer 38. The opaque grid 34 is preferably black for maximum absorption of light and is designed to match the lens layer 38 such that light is channeled by the lens layer 38 into the grid 34. The opaque grid 34 may be a layer adhered, laminated, or coated onto either the lens layer 38 or the matrix 14 with embedded ellipsoidal particles 18, and spheroidal particles 22. The lens layer 38 may be a lenticular or microlens layer and the lenses are preferably packed close together so that the entirety of the surface of the lens layer is covered with the lens structures. The overall transmission of the material 10 may be increased from about 40% to about 65% by addition of the opaque grid contrast layer 34 and the lens layer 38, collectively referred to as the contrast enhancement layer.

Figure 3:
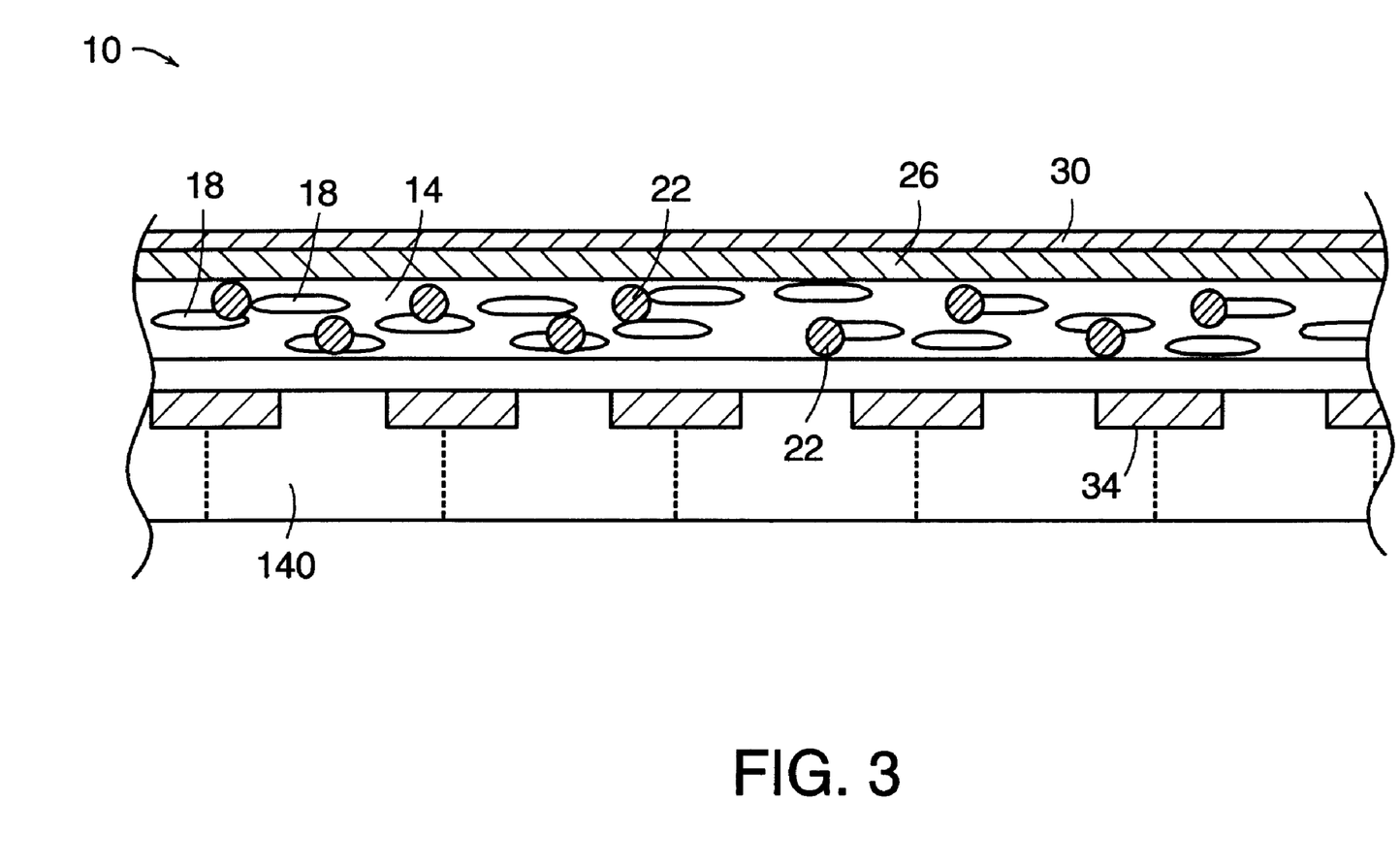
FIG. 3 is a schematic cross-sectional side view of another embodiment of a light-transmissive material constructed in accordance with the present invention.

FIG. 3 is a schematic cross-sectional side view of another embodiment of a light-transmissive material 10 in accordance with the present invention. In general overview, the light transmissive material 10 includes a matrix 14 with embedded ellipsoidal particles 18, and embedded spheroidal particles 22. The material 10 may also include an optional hardcoat 26 and an optional anti-reflective coating 30. The material 10 may also include an opaque grid contrast layer 34 and a graded refractive index lens layer 140, collectively referred to as the contrast enhancement layer. The composition of the matrix 14, ellipsoidal particles 18, spheroidal particles 22, hardcoat 26, and anti-reflective coating 30 are as described in FIG. 2 above. The opaque grid 34 is preferably black for maximum absorption of light and is designed to match the graded refractive index lens layer 140 such that light is channeled by the graded refractive index lens layer 140 into the grid 34. The opaque grid layer 34 may be adhered, laminated, or coated onto either the graded refractive index lens layer 140 or the layer defined by matrix 14 with embedded ellipsoidal particles 18, and spheroidal particles 22.

The graded refractive index lens layer 140 is preferably formed so that the graded refractive index lenses are packed close together so that the entirety of the surface of the lens layer is covered with the lens structures. The curvature of the graded refractive lenses may be such that light incident upon the lenses is totally internally reflected. By selection of the curvature and the angles at which light strikes the surface, for example with a Fresnel Lens, the light exiting the sheet can be manipulated. The overall transmission of the material 10 may be increased from about 40% to about 65% by addition of the opaque grid contrast layer 34 and the graded refractive index lens layer 140.

Figure 4:
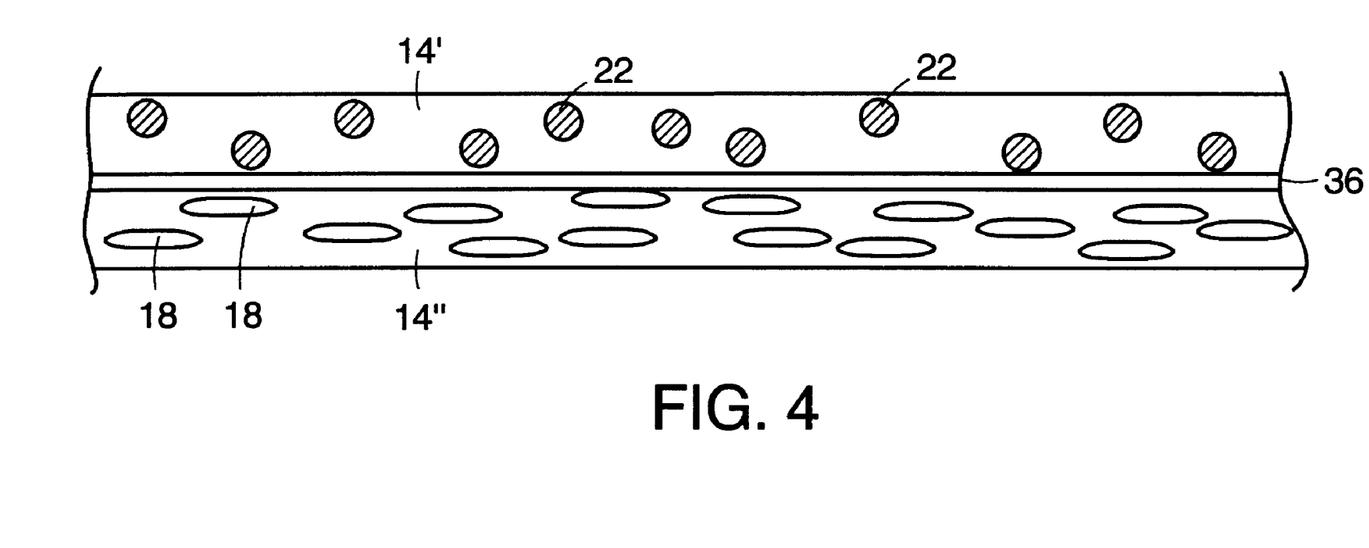
FIG. 4 is a schematic cross-sectional side view of another embodiment of a light-transmissive material constructed in accordance with the present invention.

FIG. 4 is a schematic cross-sectional side view of yet another embodiment of a light-transmissive material in accordance with the present invention. In this embodiment two distinct layers are formed by matrices 14' and 14". A first layer is defined by the matrix 14" with embedded ellipsoidal particles 18 and a second layer defined by the matrix 14' with embedded spheroidal particles 22. Matrix 14' and matrix 14" may be constructed of the same or different material as described above. Although a transparent divider 36 is present in the depicted embodiment, it should be understood that the matrices 14' and 14" may directly contact each other.

Figure 5:
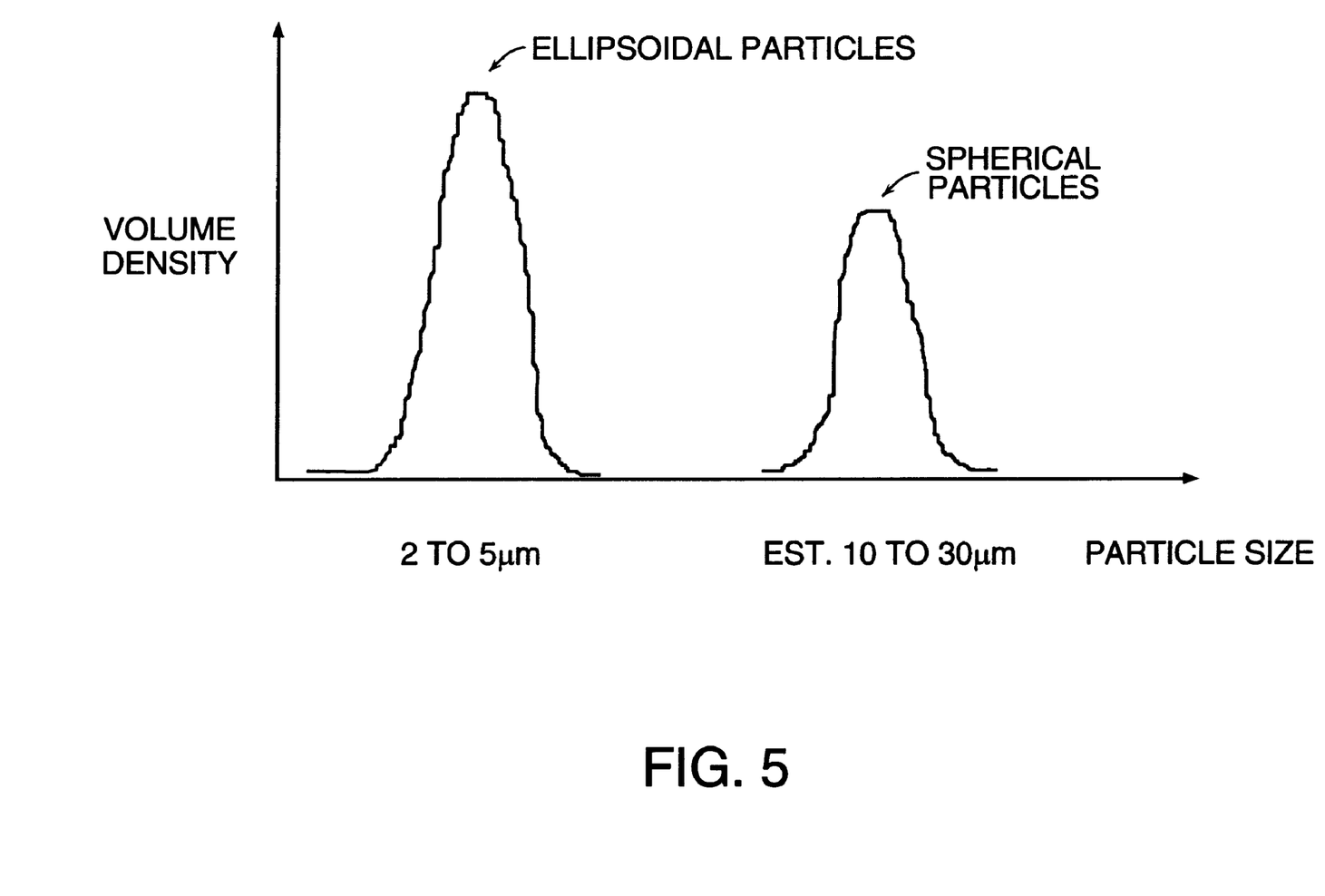
FIG. 5 is a graph depicting volume density versus particle size for a light-transmissive material constructed in accordance with the present invention.

FIG. 5 is a graph depicting volume density versus particle size for a preferred light-transmissive material constructed in accordance with the present invention. The graph plots particle size as measured along a minor axes of the ellipsoidal particles and the diameter of the spheroidal particles versus the volume density of the particles encountered in a sheet of material defined by the matrix with embedded ellipsoidal particles and spheroidal particles. FIG. 5 shows that the ellipsoidal particles are from about 2 $\mu$m to about 5 $\mu$m in diameter along the minor axis and the spheroidal particles are from about 10 $\mu$m to about 30 $\mu$m in diameter.

The matrix may also include compatibilizers to improve the processing and performance of the material of the present invention. These compatibilizers are described in greater detail in pending U.S. patent application Ser. No. 08/962,743, filed Nov. 3, 1997, which is incorporated herein by reference.

A further embodiment includes the addition of a second spheroidal particle material selected from the group of materials which differ in material of construction, refractive index, size, and other variable properties, from the other particles in order to further manipulate the vertical angle of view and scintillation.

It is envisioned that this material may be used in conjunction with and disposed in front of a Fresnel Lens. Since the light from a Fresnel Lens is collimated, the light may be channeled by the contrast enhancement layer without the typical loss in overall screen transmission of light. The contrast enhancement layer may increase the horizontal angle of view to such an extent that the amount ellipsoidal particles embedded in the matrix may be significantly reduced or even eliminated.

Additionally, because neither the diffusion screen or the contrast enhancement layer substantially affect the polarization of light, the material of the present invention may be incorporated into systems which use polarization effects to produce image contrast to achieve improved transmission ratios.

Figure 6:
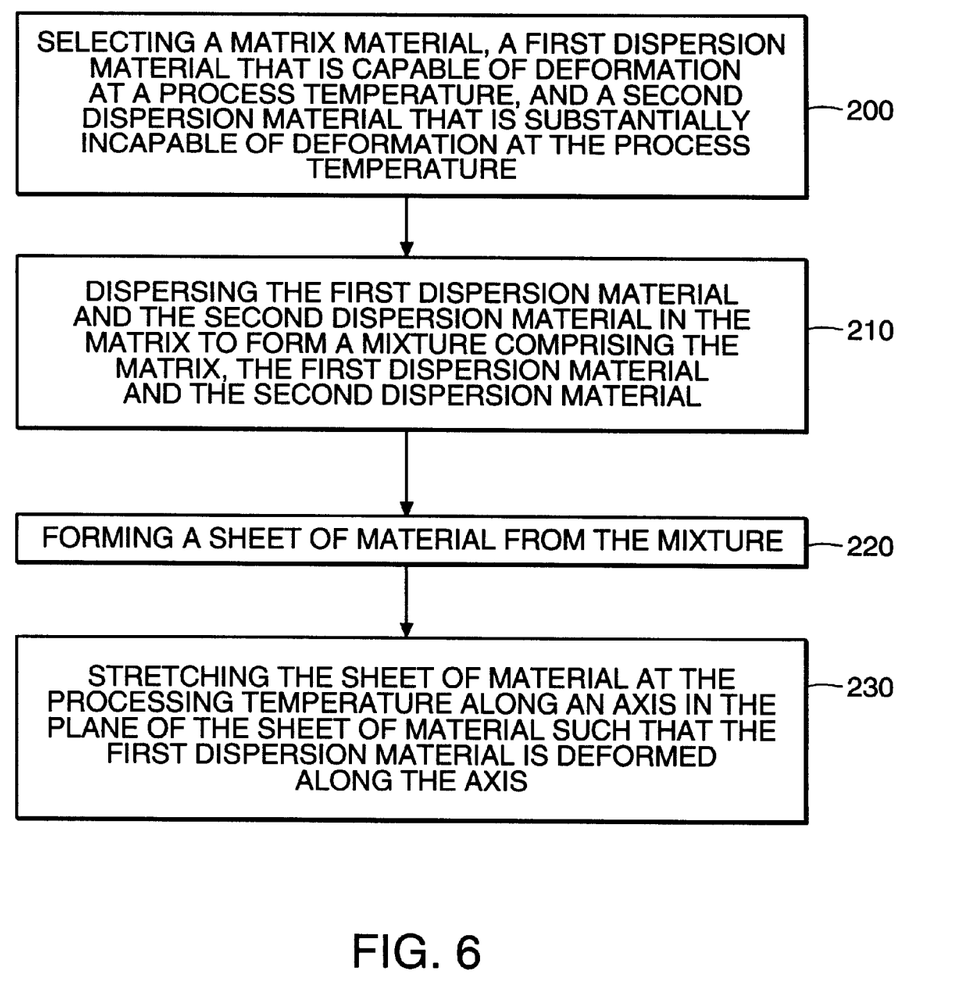
FIG. 6 is a flowchart diagram illustrating a method of forming a sheet of light-transmissive material in accordance with the present invention.

FIG. 6 is a flowchart diagram illustrating a method of forming a sheet of light-transmissive material in accordance with the present invention. A method for forming a sheet of light-transmissive material in accordance with the present invention includes: selecting a matrix material, a first dispersion material that is capable of deformation at a process temperature, and a second dispersion material that is substantially incapable of deformation at the process temperature (step 200); dispersing the first dispersion material and the second dispersion material in the matrix to form a mixture comprising the matrix, the first dispersion material and the second dispersion material (step 210); forming a sheet of material from the mixture (step 220); and stretching the sheet of material at the processing temperature along an axis in the plane of the sheet of material such that the first dispersion material is deformed along the direction of stress (230).

The process of may further include the step of heating the mixture to the processing temperature prior to forming the sheet or prior to stretching the sheet.

The sheet may be formed by extruding the mixture through a die to form the sheet of material. Alternatively, the sheet may be formed by pouring the mixture onto a flat surface. Additionally individual layers, such as a lenticular lens layer, may be coated or laminated onto each other. The opaque grid layer may be printed onto another layer or a carrier layer, for example, a polycarbonate, polyester, or cellulose triacetate layer. The lens layer may be embossed by low impact embossing techniques which allow for high resolution and low manufacturing costs.

The sheet may be stretched as it exits from a die by winding the sheet of material on a take-up roll at a rate faster than the sheet formation rate. If the sheet is stretched at the processing temperature, the first dispersion material will be deformed in the direction along which it is stretched.

Alternatively, the sheet may be stretched upon a frame at the processing temperature in order to deform the first dispersion material. Provided the sheet is stretched to a greater degree in one direction, the ellipsoidal particles will be oriented in that direction.

It should be understood that the order of the steps for making the light-transmissive material is immaterial except that the mixture needs to be formed prior to further processing, i.e., e.g., forming a sheet, heating, stretching, extruding, and/or winding. In addition, two or more of the steps described above may be conducted simultaneously.

A method of forming the embodiment of the invention shown in FIG. 4 is to form a first sheet of spherical particles in a matrix; form a second sheet of particles in a matrix and stretching the sheet to form ellipsoidal particles as described above and then laminating the sheets together. Variations such as having two sheets of ellipsoidal particles oriented with the major axes of the particles in one sheet at an angle to the major axes of the particles in the other sheet are also possible.

Table 1 demonstrates the improvement in the gain and control of both the horizontal AOV and vertical AOV that may be achieved in accordance with the present invention. The first row shows the optical characteristics for a matrix layer with embedded ellipsoidal particles. The second row shows the same characteristics for a lenticular lens array layer, which approximates the effect of a layer containing spheroidal particles. The third row shows the improved results achieved when the materials of row 1 and row 2 are laminated together. The fourth row shows the results for a traditional light-transmissive layer for comparison with the material of the present invention, which is a matrix containing only spheroidal particles. The fifth and sixth rows are the estimated results of adding a contrast enhancement layer to the laminated screen of row 3 and the traditional layer of row 4.

Although generally the preferred embodiments of the invention have been shown and described, numerous variations and alternative embodiments will occur to those skilled in the art. Accordingly, it is intended that the invention be limited only in terms of the appended claims as the invention may be embodied in other specific forms.

What is claimed is:

1. A planar light-transmissive material comprising:

a matrix;

a plurality of ellipsoidal particles disposed within the matrix, the ellipsoidal particles having a major axes substantially oriented in one direction in the plane of the material; and a plurality of spheroidal particles disposed within the matrix.

2. The material of claim 1 wherein the matrix has a first refractive index ($n_M$) and the plurality of ellipsoidal particles has a second refractive index ($n_E$), wherein the $n_M$ is different from the $n_E$.

3. The material of claim 2 wherein a differential refractive index ($\Delta n_{ME}$) defined as $|n_M - n_E|$ is from about 0.005 to about 0.2.

4. The material of claim 1 wherein the matrix has a first refractive index ($n_M$) and the plurality of spheroidal particles has a third refractive index ($n_S$), wherein the $n_M$ is different from the $n_S$.

5. The material of claim 4 wherein a differential refractive index ($\Delta n_{MS}$) defined as $|n_M - n_S|$ is from about 0.005 to about 0.2.

6. The material of claim 1 further comprising an embossed lenticular lens layer.

7. The material of claim 6 further comprising an opaque grid aligned with the embossed lenticular lens layer.

8. The material of claim 1 further comprising a graded refractive index lens layer.

9. The material of claim 8 further comprising an opaque grid aligned with the graded refractive index lens layer.

10. The material of claim 1 wherein the matrix comprises a substantially optically clear material selected from the group of materials consisting of acrylics, polyesters, polystyrenes, polyolefins, polyolefin copolymers, polyamides, cellulite esters, and polycarbonates.

11. The material of claim 10 wherein the matrix comprises a substantially optically clear copolymer of polypropylene and polyethylene.

12. The material of claim 1 wherein the ellipsoidal particles comprise a substantially optically clear material selected from the group of materials consisting of acrylics, polystyrenes, polypropylenes, cellulose esters, and polycarbonates.

13. The material of claim 12 wherein the ellipsoidal particles comprise a substantially optically clear polystyrene.

14. The material of claim 1 wherein the spheroidal particles comprise a cross-linked acrylic.

15. The material of claim 1 wherein the plurality of ellipsoidal particles have an average particle size distribution from about 2 micrometers to about 5 micrometers.

16. The material of claim 1 wherein the plurality of spheroidal particles have an average particle size distribution from about 10 micrometers to about 30 micrometers.

TABLE 1

| | Asymmetry Ratio | Gain | Horizontal Angle of View | | | Vertical Angle of View | | |
|---|---|---|---|---|---|---|---|---|
| | | | $\alpha(\frac{1}{2})$ | $\beta(\frac{1}{3})$ | $\chi(\frac{1}{10})$ | $\alpha(\frac{1}{2})$ | $\beta(\frac{1}{3})$ | $\chi(\frac{1}{10})$ |
| Diffuser Element | 1.8 | 15.0 | 27° | 36° | 59° | 15° | 19° | 31° |
| Lens Array | 13.8 | 25.0 | 55° | 69° | 73° | 4° | 6° | 12° |
| Laminated Screen | 3.5 | 5.3 | 56° | 70° | 106° | 16° | 22° | 44° |
| Traditional Estimate with 50% contrast enhancement layer | 1.9 | 4.0 | 56° | 72° | 110° | 29° | 38° | 61° |
| Laminated Screen | 3.5 | 5.3 | 56° | 70° | 106° | 16° | 22° | 44° |
| Traditional | 1.9 | 2.0 | 56° | 72° | 110° | 29° | 38° | 61° |

* * * * *